Feb. 7, 1956          G. C. BLANKE          2,734,162

VOLTAGE REGULATING CIRCUIT

Filed Jan. 18, 1954

INVENTOR.
GORDON C. BLANKE

BY HIS ATTORNEYS.
HARRIS, KIECH, FOSTER & HARRIS

United States Patent Office 2,734,162
Patented Feb. 7, 1956

2,734,162

VOLTAGE REGULATING CIRCUIT

Gordon C. Blanke, Sierre Madre, Calif., assignor to Beckman Instruments Inc., South Pasadena, Calif., a corporation of California Application January 18, 1954, Serial No. 404,510

4 Claims. (Cl. 321—15)

My invention relates to rectifying and voltage regulating circuits which produce a voltage-controlled direct curent output from a source of alternating potential and which are capable of supplying a substantially constant output voltage independent of variations in the input voltage and independent of changes of load within the range for which the circuit is designed. The invention is adapted to supply direct current output voltages near the voltage of the alternating current source or it can be readily used as a voltage-doubling circuit.

It is an object of the invention to provide a regulating circuit in which any variations in output voltage, whether caused by a variation in input voltage, a variation in load or any other cause, is fed back to a control element of a rectifying and amplifying device in such a manner as to oppose the variation in output voltage. The rectifying and amplifying device may be any of various kinds, for example a thermionic tube or composite of tubes such as a multistage amplifier, or it may be a transistor or composite of transistors. Preferably, however, it is a thermionic tube or thermionic tube circuit.

Another object of the invention is to establish an electrical feedback signal which is at least a portion of the voltage variation or error occurring in an existing output of a thermionic circuit including a control device, such a rectifying and amplifying device; also to supply such a feedback signal to a control element of the control device.

A further object is to provide means whereby substantially all of the output voltage or a portion thereof is opposed to a constant reference voltage acting as a bucking or constant D. C. biasing means, the difference potential being applied to said control element as a feedback voltage. The reference voltage may be derived from a battery, a circuit point of substantially constant voltage or any other source of substantially constant voltage such as a voltage developed across one or more gas-discharge tubes.

An additional object is to provide a combined rectifying and voltage regulating circuit which requires only a single thermionic tube, typically a triode.

A further object of the invention is to provide various specific circuit elements for improving the voltage regulating action of the circuit, such as a resistor of non-linear voltage vs. current relationship, a cascode amplifier as part of the thermionic circuit, etc.

Further objects and advantages of the invention will be apparent to those skilled in the art from the following description of exemplary embodiments taken with the accompanying drawing, in which.

Figure 1:
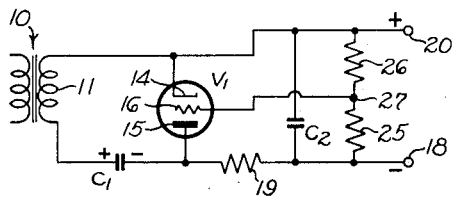
Fig. 1 is a circuit diagram of a regulating circuit without doubling action.
Figure 5:
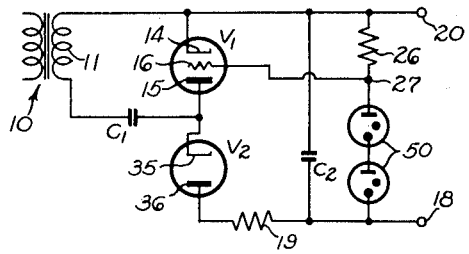
Figure 6:
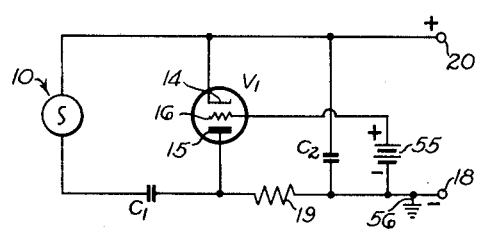
Figure 7:
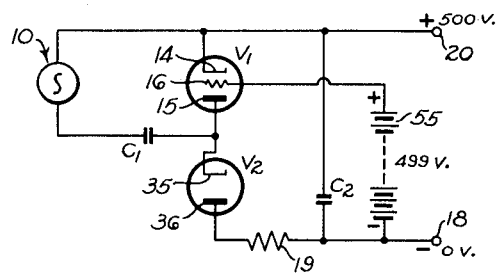
Figure 8:
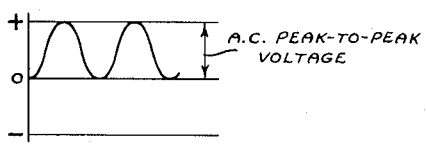

Fig. 5 illustraets a further alternative of a voltage doubling circuit in which the reference potential is derived by use of gas-discharge tubes;

Fig. 6 illustrates a non-voltage-doubling circuit showing another way in which the voltage of a battery is used as the reference potential;

Fig. 7 illustrates a voltage-doubling circuit showing a method of employing a battery as a reference as in Fig. 6, and Fig. 8 is a graphical representation of certain voltage relationships explanatory of the operation of the embodiment of Fig. 1.

Referring to Fig. 1, illustrative of certain features of the invention, a source of alternating potential 10 is shown as a transformer having a secondary winding 11 connected serially with a capacitor $C_1$ across to the input of an amplifying and rectifying device shown as a thermionic tube $V_1$. The tube $V_1$ is exemplified as a triode having a cathode 14, heated by a filament not shown, connected to one terminal of the secondary winding 11. The tube $V_1$ also includes an output anode 15 connected to the capacitor $C_1$ and a grid 16 which is here the control element of the tube. The potential of the grid 16 controls the conductance of the tube, i. e., the magnitude of the electron flow from the cathode 14 to the anode 15 and thus the anode-cathode current. Alternatively, the capacitor $C_1$ may be connected between the other terminal of the secondary winding and the cathode of $V_1$.

The output circuit of the tube $V_1$ includes a first output terminal 18 connected to the anode 15 by a suitable means, here shown as a simple conductor in which a current-limiting resistor 19 can be, but is not necessarily, disposed. A similarly-functioning resistor can be connected serially in the input circuit, if desired. A second output terminal 20 can be connected to the cathode 14 or to any other portion of the circuit at a potential constant with respect to cathode 14. A capacitor $C_2$ is connected between the terminals 18 and 20 or between the former and some other suitable point so as to bridge the output of the circuit.

The invention contemplates a suitable feedback circuit serving the function of applying to the control element of $V_1$ a signal which varies in such magnitude and sense as to largely counteract variations in the output voltage which tend to be caused by line or load variations, e. g., feeding at least a portion of the voltage variation of the output circuit or terminal to the control element of $V_1$. As an auxiliary function, the feedback circuit of the invention also biases the control element, in this case the grid of $V_1$, i. e. sets it at a D. C. potential at or near the potential of the cathode, depending on the biasing requirements of the particular tube $V_1$ used. Otherwise stated, the invention establishes by such a feedback circuit a negative feedback signal which is a fraction or all of the output voltage error and which is fed to the control element of $V_1$.

Considering Fig. 1, a minute fraction of the output current of $V_1$ is by-passed from a suitable circuit point, in this case the positive output terminal 20, to terminal 18, the current flowing through resistors 25 and 26 in series, the common terminal or circuit point 27 of the resistors being connected to the grid 16. If desired, the circuit point 27 may be merely a tap of a single resistor having sections corresponding to the resistors 25 and 26. By proper circuit design, the voltage drop across the resistor 26 is made equal to or near the desired operating grid bias for $V_1$.

While the resistors 25 and 26 may both be of the ordinary or "ohmic" type, it is preferable in this circuit that the resistor 25 be of the type having a suitable non-linear voltage-current function, e. g., a "Thyrite" resistor. This has the advantage over an ordinary resistor that the voltage change across the non-linear unit occuring for a given current change is smaller. Accordingly, a larger share of the total of any change of voltage drop across the divider is assumed by the resistor 26 than would be the case if resistor 25 were of the "ohmic" type. Consequently, feedback to the grid 16 of change of output voltage is increased, and regulating action improved. The regulating mechanism of this and other circuits of the invention is explained in detail hereinafter.

During the half cycle in which the cathode 14 is negative and the anode 15 is positive, $V_1$ is conducting and the capacitor $C_1$ will be charged substantially to half the peak-to-peak potential of the A. C. source 10, the charge being with the polarity shown. During the succeeding half cycle, the tube $V_1$ is nonconducting and the capacitor $C_1$ will not be appreciably discharged. If the charge drawn off from the output terminal 20 during each cycle is small as compared to the charge stored in $C_1$, the charge and voltage on $C_1$ remain substantially constant and the capacitor can be considered to act as a battery connected in its place, so far as concerns effect on the output. Disregarding the filtering action of the output capacitor $C_2$, and assuming a relatively small load, the output will be the resultant of the full A. C. potential of the source and a D. C. potential of a value equal to the A. C. peak, as exemplified graphically in Fig. 8 if the anode 15 is considered a reference point of zero potential. With $C_2$ present in the circuit, the output will be the average voltage of the waveform shown, i. e., a D. C. potential nearly equal to half the peak-to-peak voltage of the A. C. source 10.

The voltage-regulating action of the circuit can be explained as follows: With diminished source voltage or increased load on the output circuit, the terminal 20 tends to become less positive, i. e., the total voltage drop across the resistors 25 and 26 is diminished. Accordingly (and in greater degree if the resistor 25 is of suitable non-linear type) the voltage across the resistor 26 is diminished also and the grid 16 becomes more positive with respect to the cathode 14, this increasing the conduction of the tube $V_1$. This increases the charge applied to $C_1$ during each charging cycle, and thereby the current through the resistors 25 and 26, thus substantially counteracting the tendency of the output voltage to fall. In this manner there is applied to the control element of $V_1$ a signal which varies in magnitude and in such sense as to substantially nullify and correct variations in the output voltage. In Fig. 1, the signal voltage fed back to the control element is a relatively small fraction of the voltage change in the output circuit, albeit the fraction is increased severalfold when the resistor 25 is made a suitable nonlinear rather than a linear resistor. In general, in the simpler case in which both resistors are of the "ohmic" type, signal voltage applied to the grid is divided down by the ratio of the divider, i. e., $R_{26}/(R_{25}+R_{26})$, where $R_{25}$ is the resistance value of the resistor 25 and $R_{26}$ is the resistance value of the resistor 26.

Figure 2:
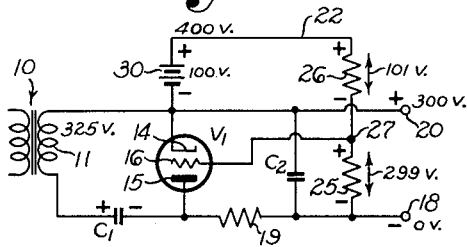
Fig. 2 is a circuit diagram of an alternative regulating circuit without voltage doubling action and which employs a source of reference potential.

Fig. 2 illustrates an embodiment of the invention similar to that of Fig. 1, in which, however, a source of stable potential illustrated by a battery 30, serves as a voltage reference and a means of greatly increasing the fraction of output voltage error which is fed back to the grid 16. As shown in Fig. 2, the battery is connected between the cathode 14 of $V_1$ and the positive end of the resistor 26 by a conductor 22. The battery 30 is connected in such polarity as to oppose the voltage drop across the resistors 25 and 26 or either of them, viz., with its negative terminal connected to the cathode 14 of $V_1$ and its negative terminal to the resistor 26. The resistor 26 is furthermore selected of such value that the voltage drop across it substantially balances the battery voltage, the difference being only that required to properly bias the grid 16. Accordingly, any changes occurring in the balance between these two voltages, as a result of varying current in the resistor 26 when the load or the line voltage is changed, are applied as a signal to the grid 16. For example, if the secondary winding 11 delivers about 325 v. A. C. and if the output terminal 20 is to be at a potential of +300 v. D. C. with respect to the output terminal 18, as suggested by the exemplary voltages and polarities of Fig. 2, the voltage of the battery 30 may be about 100 v., the voltage drop across the resistor 26 being about 101 volts (so as to supply a negative bias of about 1 v. to the grid 16), i. e., substantially equal and opposite to the voltage of the battery 30, differing therefrom only by the bias voltage, and the voltage drop across the resistor 25 being 299 volts.

The action of the circuit is such as to maintain the current through the resistor 26 substantially constant so that the voltage drop across this resistor, caused by current flowing therethrough, will oppose and always be substantially equal to the reference voltage of the battery 30.

As in Fig. 1, the fraction of output voltage error which is fed back to the grid 16 is $R_{26}/(R_{25}+R_{26})$. Assuming that the resistor 25 is linear, and that the battery and circuit output voltages are of the values shown, the fractional voltage error fed back is substantially ¼, this being much higher than that achievable in the circuit of Fig. 1 even with the best non-linear resistors currently available. Furthermore, the resistor 25 in Fig. 2 may also be non-linear for further improvement of performance. By utilizing a battery of higher potential relative to the output potential, and by proportionately increasing the value of the resistor 26, it may be seen that larger error-fractions may be fed back to the control element. An alternative arrangement for using relatively high-voltage batteries or other reference voltage sources will be described hereinbelow in other embodiments of the invention.

Figure 4:
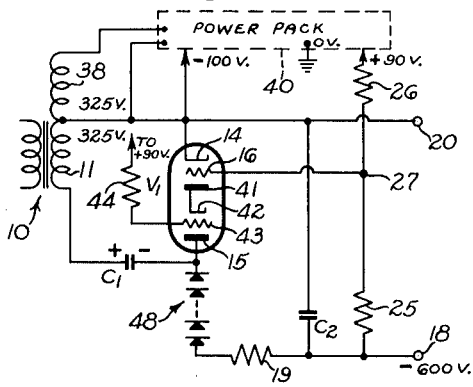
Fig. 4 illustrates an alternative voltage doubling circuit in which the reference potentials are supplied from other circuit points and in which the sensitivity and effectiveness are improved by a cascode amplifier and a dry-disc rectifier.

The voltage-regulating action can be further improved by substituting for $V_1$ in the circuit of Fig. 2 a multi-stage amplifier, e. g., a cascode-type amplifier of the type suggested in Fig. 4.

To convert the circuit of Fig. 1 or Fig. 2 into voltage-doubling circuit it is necessary only to insert a suitable rectifier between the anode 15 and the output terminal 18. The D. C. output voltage will then approach the peak-to-peak value of the waveform shown in Fig. 8. This may therefore be substantially twice the potential of the A. C. source 10, assuming that the load on the output is small. The action of the rectifier is to prevent back discharge of capacitor $C_2$ toward the source 10 into the capacitor $C_1$ when the anode 15 is positive.

Figure 3:
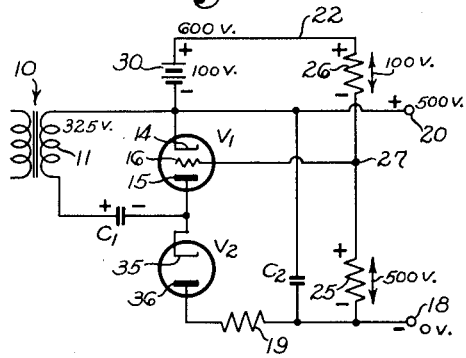
Fig. 3 illustrates a circuit similar to that of Fig. 2, but having voltage doubling action.

Fig. 3 shows such a voltage-doubling circuit, employing a diode $V_2$ as the rectifier, the cathode 35 thereof being connected to the anode 15 and the anode 36 of the diode being connected to the resistor 19, if used. The voltages and polarities shown are exemplary of a system in which a regulated output of +500 volts is desired, considered relative to output terminal 18, the voltage across the battery 30 or the resistor 26 actually departing from that shown to apply a small voltage bias to the grid 16 of $V_1$. In Fig. 3, the capacitor $C_1$ is charged during one-half cycle as before, and during the succeeding half cycle the voltage of $C_1$ is additive to the voltage of the winding 11 of the source 10. Now, however, because of the use of the rectifier $V_2$, these added voltages are nearly fully available at the terminals as D. C., being reduced only by the voltage drop in $V_2$ and in resistor 19, if used, and to a small further extent dependent on load current magnitude relative to the size of capacitor $C_2$.

It should be apparent that the regulating voltage need not be derived from a battery, as suggested in Figs. 2 and 3, but can be obtained from any other stable source, often from some stable points of reference potential in the voltage dividing network itself, as will be further exemplified in Fig. 5, or in related circuitry, as exemplified in Fig. 4. Referring to Fig. 4, the transformer source 10 has a second winding 38 supplying A. C. to a power pack 40 which has regulated points of reference potential of —100 v. and +90 v. relative to another circuit point (ground) designated as zero. The cathode 14 of $V_1$ and the resistor 26 of the voltage dividing network are respectively connected to these two points of regulated potential. The circuit of Fig. 4 is particularly designed to produce a regulated voltage of —600 v. at the terminal 18 for use in an accessory to an A. C.-energized spectrophotometer already equipped with the tapped-winding transformer source and the power pack 40. The substantially constant voltage difference between the regulated points of reference potential (—100 v. and +90 v.) serves as a substitute for the aforesaid battery.

Fig. 4 shows also two other modifications of the circuit of Fig. 3 which are often desirable in high-voltage, well-regulated, voltage-doubling circuits. In the first place, $V_1$ is shown as a cascode amplifier of the double-triode type containing not only a cathode 14, and grid 16 operating in the manner previously described but also an anode 41, adjoining said cathode and grid to form a first amplifier stage and another trinity of elements shown as a cathode 42 connected internally or externally of the tube envelope with the another 41, a grid 43 which may be connected through a resistor 44 to a biasing potential such as the +90 v. of the power pack 40, and a new amplifier output anode, still however designated by the numeral 15, which is connected to $C_1$. Such a cascode amplifier may be, as shown, in a single envelope of the 12AX7 type and improves the regulation by the same factor that it increases the gain of the feedback loop. In the second place, the circuit of Fig. 4 substitutes a selenium rectifier assembly 48 for $V_2$. Due to the high-inverse peak voltage applied to $V_2$, it is often preferable to substitute such a dry-disc type of rectifier. This avoids the inconvenience of providing an isolated filament power supply for $V_2$ (if of the directly heated type) or of providing power to the filament in such a manner that the maximum allowable heater to cathode voltage is not exceeded (if $V_2$ is of the indirectly heated cathode type).

Referring particularly to Fig. 5, the circuit is generally similar to that of Fig. 3, except that a portion of the voltage-dividing network substitutes for the battery 30. This portion is so adapted that the voltage thereacross remains substantially constant irrespective of changes in current therethrough. One or more gas-discharge voltage regulator tubes 50 may be used in this connection, occupying the position of the resistor 25 but serving to maintain the voltage of circuit point 27 substantially constant with respect to the output terminal 18 irrespective of changes in output voltage and current flow through the resistor 26 and the gas-discharge tubes. Here, as in the embodiments of Figs. 6 and 7, the cathode 14 is effectively the control element of the cathode-grid pair, the voltage of the grid being maintained substantially constant wtih respect to one of the output terminals, and the varying voltage of the cathode being used to control the anode-cathode current of $V_1$. If, for example, the load increases, the output terminal 20 will tend to become less positive and less current will flow through the gas-discharge tubes 50 and through the resistor 26. The potential of the circuit point 27 will remain substantially constant but the decreased current through the resistor 26 will reduce the negative biasing voltage applied to the cathode 14, hence increasing the conductance of $V_1$ and substantially nullifying the tendency of the output voltage to fall. Since the voltage drop across the gas-discharge tubes is constant, it follows that the total decrease in output voltage must appear across the resistor 26. Circuit point 27 and the grid of $V_1$ accordingly become more positive with respect to the $V_1$ cathode, thereby increasing the conductance of $V_1$ and substantially nullifying the drop of output voltage.

It will be seen that the effect of the regulator tube or tubes 50 in the circuit of Fig. 5 is to subtract from the output seen between terminals 20 and 18 a constant reference or comparison potential, the difference (existing across resistor 26) being applied across the grid and cathode of $V_1$ as a feedback voltage.

A very simple embodiment of the invention is shown in Fig. 6 where a battery 55, serving as a constant voltage reference, is connected between the output terminal 18 and the grid 16 of $V_1$. If, for example, the source 10 (here shown diagrammatically) supplies an A. C. potential of 300 v. a D. C. output of nearly equal magnitude will be obtained across the terminals 20 and 18. The battery 55, connected between terminal 18 and the grid, is required to have a voltage equal to or nearly equal to the D. C. output potential, depending on the grid biasing requirements of $V_1$. The battery will be useful for the duration of its shelf life because substantially no current is drawn therefrom, its function being merely to maintain substantially constant the voltage of the grid 16 with respect to the output terminal 18. Any change in output voltage is reflected directly as a change in grid to cathode potential in a manner to maintain the output voltage substantially constant.

It is apparent that in the circuit of Fig. 6 (as also in that of Fig. 7, to be described hereinbelow) the effect of the battery 55 is to subtract a fixed reference potential from that existing across the output terminals, the difference being applied across the grid and cathode of $V_1$. If the output voltage changes, this difference voltage changes by a like amount and in such direction as to substantially fully correct the output voltage variation. The mechanism of the correcting action is identical with that described for the circuit of Fig. 5.

Fig. 7 exemplifies a voltage-doubling circuit using a reference battery 55 in the same manner as in the circuit of Fig. 6, the circuit values being typical when it is desired to develop the regulated voltages suggested. The difference between the output voltage and the voltage of the battery 55 determines the bias of the control element of $V_1$. With the voltages shown, the grid 16 will have a —1 v. bias relative to the cathode 14 and this voltage difference will vary slightly with load current in a manner tending to maintain the output voltage constant.

The embodiments of Figs. 6 and 7 require batteries producing relatively high reference voltages not far removed from the output voltage. They have the advantage, however, that if one assumes a 1 v. error in output voltage, a full 1 v. change is fed back to $V_1$ and produces a 1 v. change in potential between the grid and cathode. The feedback fraction is not equal to 1.0 in the voltage-dividing networks of Figs. 1, 2, 3 and 4 although it can be improved in all of those cases by use of a non-linear resistor 25.

The circuit of Fig. 5, like those of Figs. 6 and 7, does have a feedback fraction substantially equal to 1.0; however, with presently available regulator tubes it would probably not be economical to connect such tubes in series to regulate output voltages higher than about 300 volts.

Various changes and modifications can be made without departing from the spirit of the invention.

I claim as my invention:

1. A rectifying and voltage regulating circuit producing a voltage-controlled direct current output from a source of alternating current, said circuit including: a thermionic tube amplifier providing a first element comprising an amplifier output anode, a second element comprising a grid and a third element comprising a cathode; an input circuit for said tube including an input capacitor connected serially with said source of alternating current, said anode and said cathode; feedback means for establishing a feedback voltage which is at least a portion of said direct current output voltage and which varies as a function of such output voltage, said feedback means including a voltage divider and means connecting at least a portion of said direct current output voltage across said divider, at least one of the elements of said divider having a nonlinear current-voltage characteristic; means for supplying such feedback voltage to said grid of said tube; and means for applying to said grid a potential biasing said grid near the potential of said cathode, said means including a source of substantially constant reference voltage connected to said cathode.

2. A rectifying and voltage regulating circuit producing a voltage-controlled direct current output from a source of alternating current, said circuit including: a thermionic tube amplifier consisting of a cascode amplifier having first and second amplifier stages, said first amplifier stage comprising a first cathode, a first grid and a first anode, said second amplifier stage comprising a second cathode, a second grid and a second anode, said second cathode being connected to said first anode; an input circuit for said tube including an input capacitor connected serially with said source of alternating current, said second anode and said first cathode; feedback means for establishing a feedback voltage which is at least a portion of said direct current output voltage and which varies as a function of such output voltage, said feedback means including a voltage divider and means connecting at least a portion of said direct current output voltage across said divider, at least one of the elements of said divider having a nonlinear current-voltage characteristic; means for supplying such feedback voltage to said first grid of said tube; means for applying to said first grid a potential biasing said first grid near the potential of said first cathode, said means including a source of substantially constant reference voltage connected to said first cathode; and means for applying a substantially constant biasing potential to said second grid.

3. A rectifying and voltage-doubling circuit producing at a pair of output terminals a voltage-controlled direct current output from a source of alternating current, said circuit including: a thermionic tube amplifier providing a cathode, an output anode and a grid, the relative potential of said grid and cathode controlling the electron flow to said anode, said grid and said cathode forming a grid-cathode pair, one of the grid-cathode pair being a control element; an input circuit for said tube including an input capacitor connected serially with said source of alternating current, said anode and said cathode, said input circuit charging said input capacitor on alternate half cycles; a rectifying means connected between said anode and one of said output terminals to transmit to said output terminals on intervening half cycles the additive voltage of said source and the voltage on said capacitor resulting from its charge; a voltage divider having two resistor portions joined serially at a circuit point, one of said resistor portions being a nonlinear resistor having a voltage thereacross which changes nonlinearly with current therethrough; means for connecting said divider to bypass a small current from said direct current output and thus establish a voltage signal at said circuit point which is a function of the voltage variation across said output terminals; means for supplying said voltage signal to said control element; and means for applying to said grid a substantially constant biasing potential.

4. A rectifying and voltage-doubling circuit producing at a pair of output terminals a voltage-controlled direct current output from a source of alternating current, said circuit including: a thermionic tube amplifier consisting of a cascode amplifier having first and second amplifier stages, said first amplifier stage comprising a first cathode, a first grid and a first anode, the relative potential of said first grid and first cathode controlling the electron flow to said first anode, said first grid and said first cathode forming a grid-cathode pair, one of the grid-cathode pair being a control element, said second amplifier stage comprising a second cathode, a second grid and a second anode, said second cathode being connected to said first anode; an input circuit for said tube including an input capacitor connected serially with said source of alternating current, said second anode and said first cathode, said input circuit charging said input capacitor on alternate half cycles; a rectifying means connected between said second anode and one of said output terminals to transmit to said output terminals on intervening half cycles the additive voltage of said source and the voltage on said capacitor resulting from its charge; a voltage divider having two resistor portions joined serially at a circuit point, one of said resistor portions being a nonlinear resistor having a voltage thereacross which changes nonlinearly with current therethrough; means for connecting said divider to by-pass a small current from said direct current output and thus establish a voltage signal at said circuit point which is a function of the voltage variation across said output terminals; means for supplying said voltage signal to said control element; and means for applying to said first and second grids substantially constant biasing potentials.

References Cited in the file of this patent

UNITED STATES PATENTS

| | | |
|---|---|---|
| 1,099,960 | Zimmerman | June 16, 1914 |
| 1,848,092 | Ayer | Mar. 1, 1932 |
| 2,063,648 | Willis | Dec. 8, 1936 |
| 2,066,603 | Beetem | Jan. 5, 1937 |
| 2,086,994 | Barz et al. | July 13, 1937 |
| 2,250,102 | Klemperer | July 22, 1941 |
| 2,271,738 | Leftwich | Feb. 3, 1942 |
| 2,474,580 | Hiehle | June 28, 1949 |
| 2,504,322 | Giacoletto | Apr. 18, 1950 |